(12) United States Patent
Koul

(10) Patent No.: US 8,863,200 B2
(45) Date of Patent: Oct. 14, 2014

(54) INTERNET PROTOCOL TELEVISION NETWORK AND METHOD OF OPERATING THEREOF

(75) Inventor: Sameer Koul, Singapore (SG)

(73) Assignee: Alcatel Lucent, Boulogne-Billancourt (FR)

( * ) Notice: Subject to any disclaimer, the term of this patent is extended or adjusted under 35 U.S.C. 154(b) by 2135 days.

(21) Appl. No.: 11/819,967

(22) Filed: Jun. 29, 2007

(65) Prior Publication Data

US 2009/0007187 A1    Jan. 1, 2009

(51) Int. Cl.
| | | |
|---|---|---|
| H04N 7/16 | (2011.01) | |
| H04N 21/414 | (2011.01) | |
| H04N 7/173 | (2011.01) | |
| H04N 21/2668 | (2011.01) | |
| H04N 21/472 | (2011.01) | |
| H04N 21/4227 | (2011.01) | |
| H04N 21/61 | (2011.01) | |
| H04L 29/06 | (2006.01) | |

(52) U.S. Cl.
CPC ..... *H04N 7/17318* (2013.01); *H04N 21/41407* (2013.01); *H04N 21/2668* (2013.01); *H04N 21/47202* (2013.01); *H04N 21/4227* (2013.01); *H04N 21/6125* (2013.01); *H04L 65/4084* (2013.01); *H04N 21/6175* (2013.01)
USPC .......................................................... 725/62

(58) Field of Classification Search
USPC .......................................................... 725/62
See application file for complete search history.

(56) References Cited

U.S. PATENT DOCUMENTS

| | | | |
|---|---|---|---|
| 2006/0041923 A1* | 2/2006 | McQuaide | 725/131 |
| 2006/0291412 A1 | 12/2006 | Naqvi et al. | |
| 2007/0033622 A1 | 2/2007 | Kim et al. | |
| 2007/0067807 A1* | 3/2007 | O'Neil | 725/62 |
| 2007/0143779 A1 | 6/2007 | Kaarela et al. | |
| 2007/0150918 A1 | 6/2007 | Carpenter et al. | |
| 2007/0186267 A1 | 8/2007 | Ohde et al. | |

FOREIGN PATENT DOCUMENTS

| | | |
|---|---|---|
| JP | 2001331660 A | 11/2001 |
| JP | 2004015529 A | 1/2004 |
| JP | 2004140644 A | 5/2004 |
| JP | 2005073190 A | 3/2005 |

OTHER PUBLICATIONS

PCT International Search Report and Written Opinion dated Jun. 16, 2009.
Japanese Office Action dated Jun. 13, 2012 in corresponding Japanese Application, with English Translation.

* cited by examiner

*Primary Examiner* — Pankaj Kumar
*Assistant Examiner* — Charles N Hicks
(74) *Attorney, Agent, or Firm* — Harness, Dickey & Pierce, P.L.C.

(57) ABSTRACT

Example embodiments provide an Internet Protocol Television (IPTV) network and a method for operating thereof. Example embodiment methods may include receiving signals containing content and/or instructions from a mobile station and providing IPTV content based on that data. Example embodiment networks may include an interface connected to an IPTV network configured to receive data containing IPTV instructions and/or content and configured to transmit IPTV data based on received data from a mobile station.

11 Claims, 5 Drawing Sheets

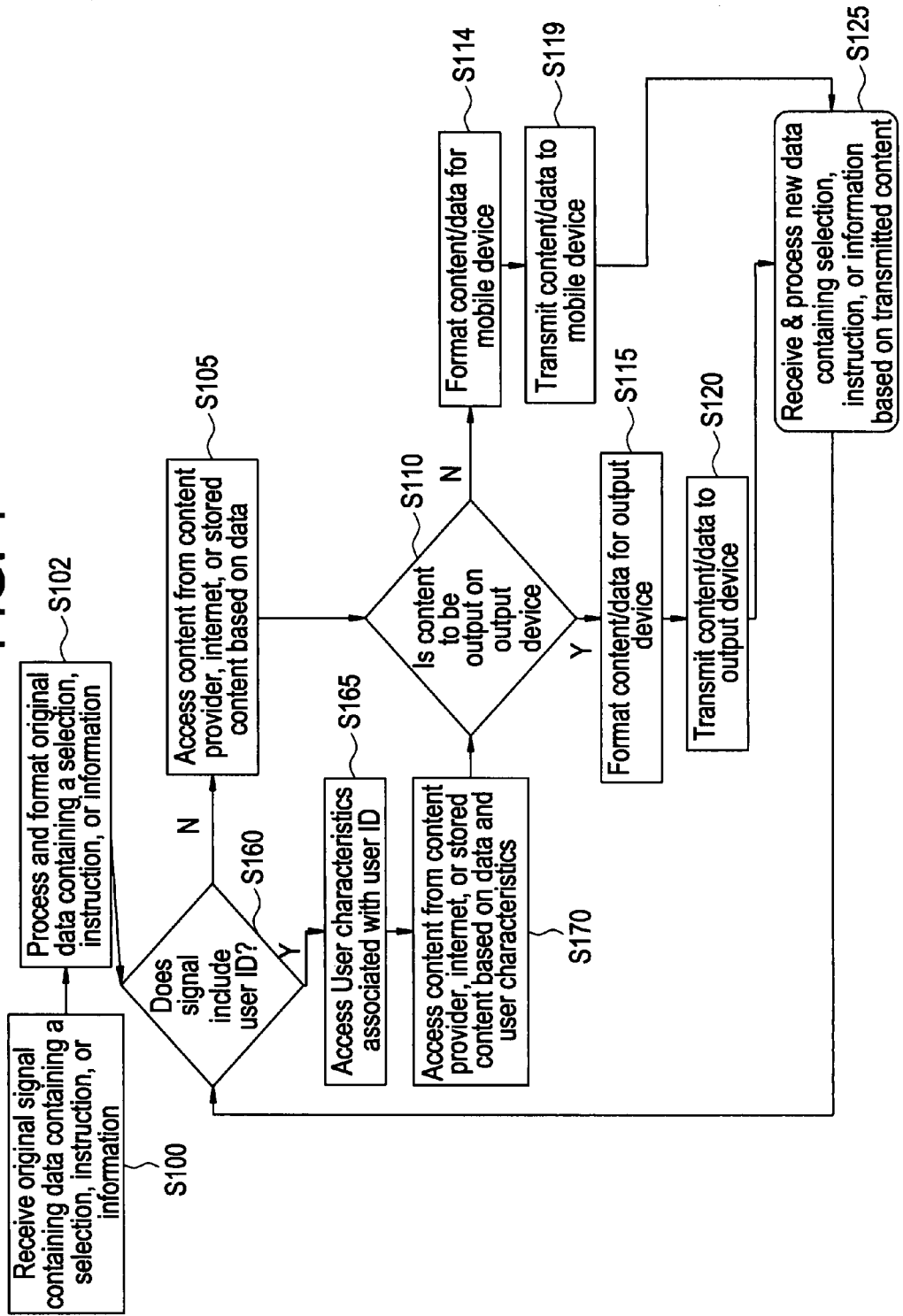

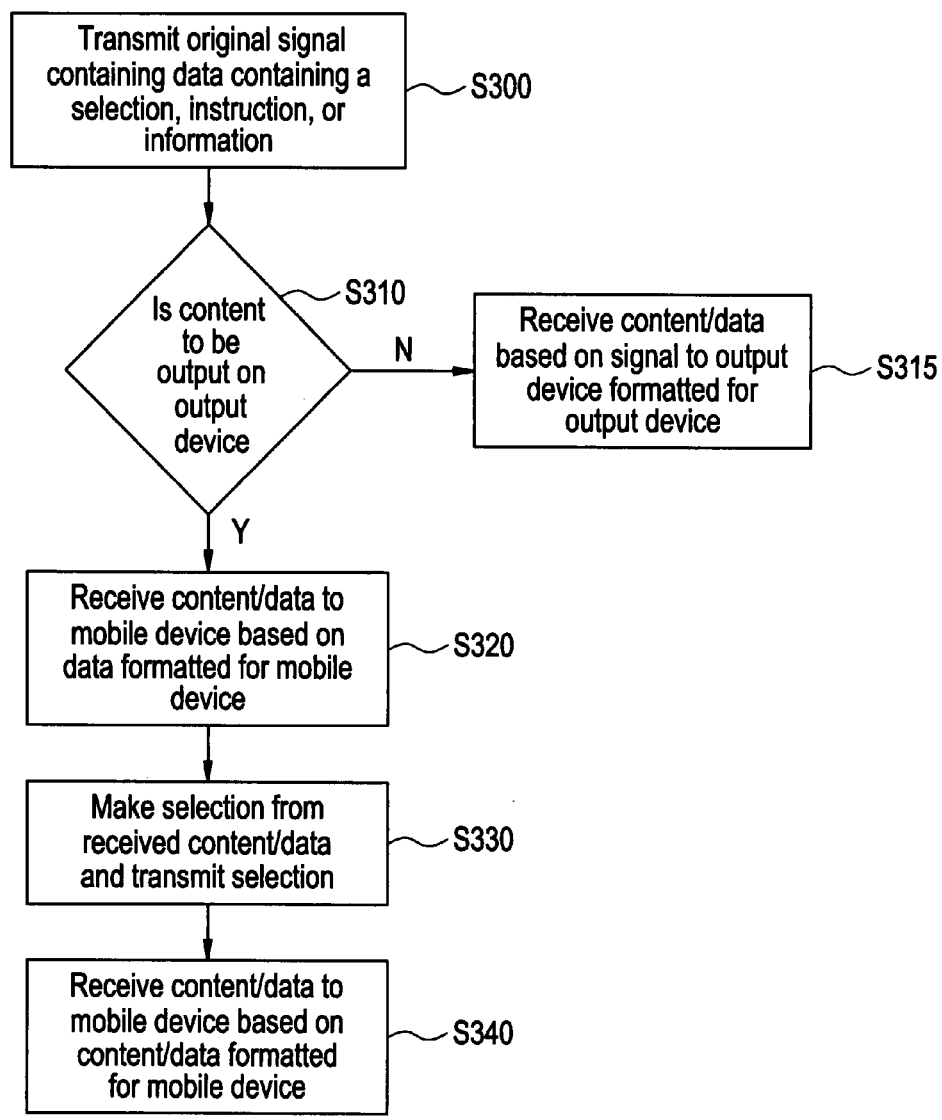

INTERNET PROTOCOL TELEVISION NETWORK AND METHOD OF OPERATING THEREOF

BACKGROUND OF THE INVENTION

1. Field

Example embodiments of the present invention relate generally to internet protocol television (IPTV) networks and methods of controlling IPTV networks.

2. Description of the Related Art

IPTV networks transmit audio-visual content using the internet protocol, often within a network infrastructure, in contrast to conventional television using electromagnetic or cable-based audio-visual content transmission. IPTV may provide services associated with the internet protocol such as internet access, digital file transfer, email access, voice-over-internet-protocol, and stored multimedia content available on demand. IPTV networks also may provide digital audio-visual content having greater image and audio quality of transmitted content compared to conventional television broadcasting.

As shown in FIG. 1, related art IPTV networks may be responsive to user input and transmit content based on user input. Related art IPTV networks generally receive user input from a remote stationary receiver 20 co-located with a multimedia viewing device 10, such as a television or monitor. The stationary receiver 20 may transmit, format, or execute IPTV content received from the IPTV network 40 to the output device 10. The stationary receiver 20 also receives user input from a user communicating with the stationary receiver 20. Related art methods of communicating with the stationary receiver include using infrared signaling devices 30 and input keypads on the stationary receivers 20.

Related art methods of providing user input use a limited-range, infrared remote as the infrared signaling device 30. Often these remotes have a keypad layout that allows users to transmit signals to the IPTV receiver with alpha-numeric or symbolic information associated the keypad. A remote 30 may transmit this information to the receiver 20, the receiver 20 may process the signal from the remote 30, and the receiver 20 may communicate with the IPTV network 40 to provide content in accordance with the signal. Related art remotes may also control an output device 10, such as a television or DVD player. The receiver 20 generally transmits limited information to the remote 30.

Related art IPTV networks and methods of operating those networks require users to be within a close proximity, typically within several meters, of the stationary IPTV receiver 20 to communicate with and operate the IPTV network 40 and the content provided to the output device 10. Related art IPTV networks and methods further allow the user to view or perceive almost all IPTV content through a separate output device 10, as limited information may be transmitted to the remote 30. Further, different receivers 20 may be useable with different remotes 30, although these stationary receivers communicate with the same IP-IV network.

SUMMARY OF THE INVENTION

Example embodiments of the present invention are directed to a method of operating an IP-IV network including communicating with the IPTV network from a mobile telephone and providing content from the IPTV network based on the communication from the mobile telephone. Example embodiments may also provide an IPTV network that is useable with example embodiment methods.

BRIEF DESCRIPTION OF THE DRAWINGS

Example embodiments of the present invention will become more fully understood from the detailed description provided below and the accompanying drawings, wherein like elements are represented by like reference numerals, which are given by way of illustration only and thus are not limiting of the present invention and wherein:

FIG. 4 illustrates an example method of operating an IPTV network.

FIG. 5 illustrates an example method of operating a mobile device.

DETAILED DESCRIPTION OF EXAMPLE EMBODIMENTS

Figure 1:
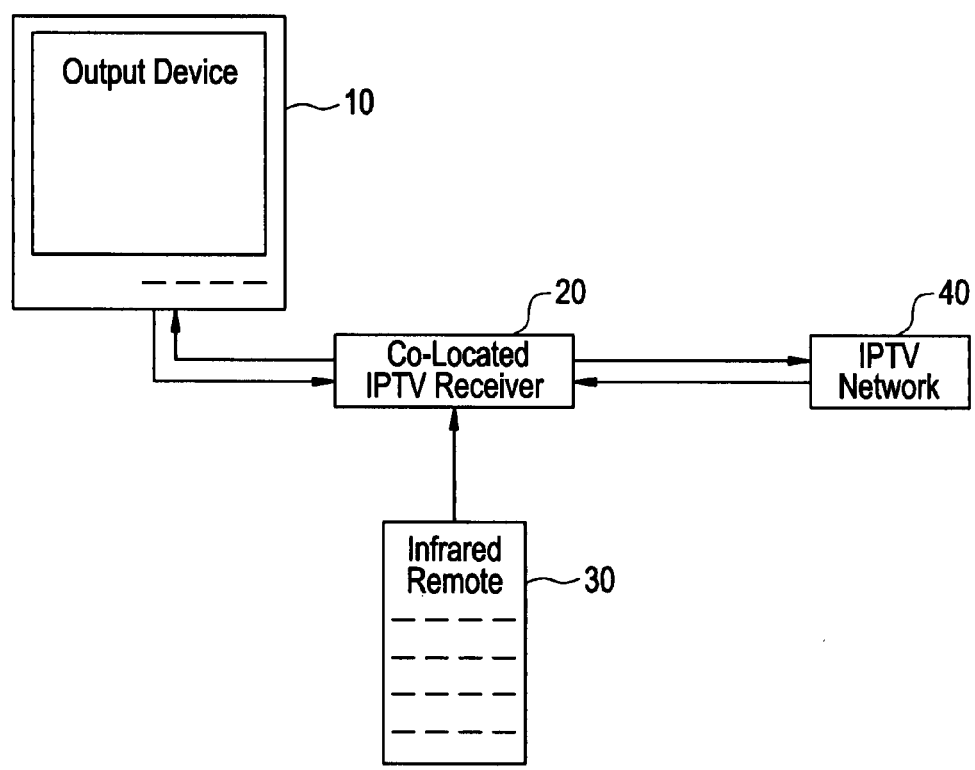
FIG. 1 illustrates a related art IPTV network.
Figure 2:
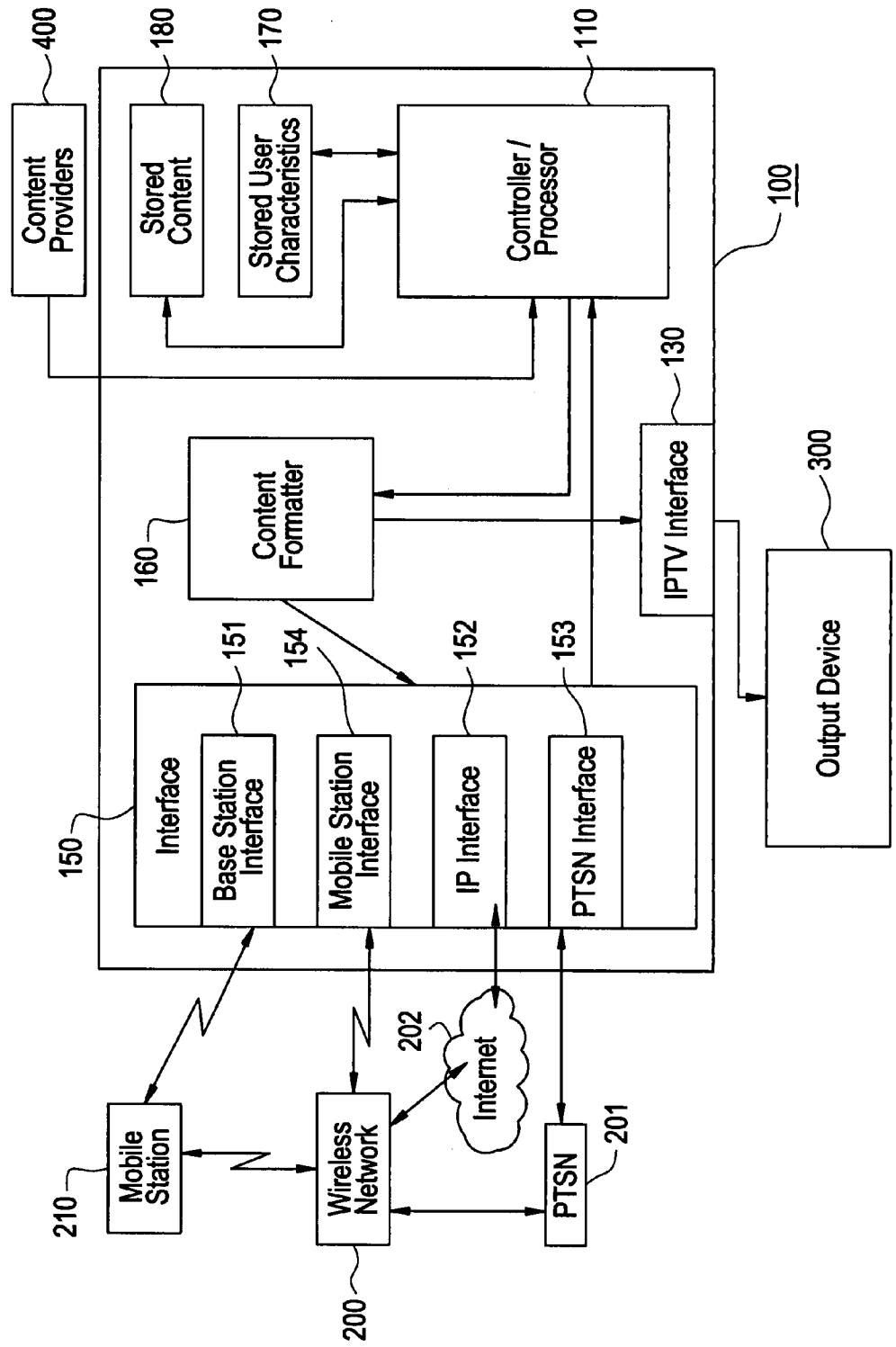
FIG. 2 illustrates an example embodiment IPTV network.

FIG. 2 is a block diagram of an example embodiment IPTV network 100 configured to be operable with example methods of operating IPTV networks. As shown in FIG. 2, an example IPTV network 100 may include an interface 150 that may communicatively connect the IPTV network 100 to a mobile station 210.

The interface 150 may communicatively connect the mobile station 210 to the IPTV network 100 through a variety of connection types and arrangements.

For example, the mobile station 210 may connect directly to the IPTV network 100 through a base station interface 151 within the interface 150. In this example, the mobile station 210 may be communicatively connected wirelessly to the IPTV network 100 through one or more known standards or protocols. For example, CDMA, WiFi, GSM, 802.11, infrared, Bluetooth, and/or any suitable wireless communication may connect the mobile station 210 with the base station interface 151. As such, the mobile station 210 may be a mobile phone, a wireless-equipped computer, a wireless-equipped personal data assistant, etc. capable of receiving, processing, and sending wireless data from/to the mobile station interface 150. Correspondingly, the base station interface 151 may be a base station, wireless receiver, and/or any other receiving device within the IPTV network 100 capable of receiving, processing, and sending wireless directly data from/to the mobile station 210.

Alternatively, the mobile station 210 may be indirectly connected to the IPTV network 100 through a wireless network 200 communicatively connected to the mobile station 210. The wireless network 200 may be communicatively connected to the mobile station 210 wirelessly through one or more known standards or protocols, including, CDMA, WiFi, GSM, 802.11, infrared, Bluetooth, and/or any other suitable wireless communication protocol. Here, the mobile station 210 may again be a mobile phone, a wireless-equipped computer, a wireless-equipped personal data assistant, or any other device capable of receiving, processing, and sending data from/to the wireless network 200. The wireless network 200 may be, for example, a wireless carrier providing wireless service to a mobile station 210, an ad hoc network of wireless-capable computers in which the mobile station 210 is connected or is a member, an internet service provider, or any other network capable of receiving, processing, and sending data from/to the mobile station 210.

In this example, the wireless network 200 is communicatively connected to the IPTV network interface 150 through one or more connection methods so as to ultimately communicatively connect the mobile station 210 to the IPTV network 100 through the interface 150. For example, the wireless network 200 may access the internet 202 using IP methods and transmit and/or receive data from an IP interface 152 capable of sending, receiving, and processing data sent through IP methods over the internet 202. Alternatively, the wireless network 200 may connect to the IPTV network interface 150 through a conventional public telephone switched network (PTSN) 201 to a PTSN interface 153 capable of sending, receiving, and processing data sent through the PTSN 201.

As a further example, the wireless network 200 may be wirelessly communicatively connected to the IPTV network 100 through the interface 150. In this example, the interface 150 includes a mobile station interface 154, which may be a mobile station, a wireless receiver, and/or any other component capable of wirelessly communicating directly with the wireless network 200. The mobile station interface 154 is capable of sending, receiving, and processing through a direct wireless connection to the wireless network 200.

The interface 150 includes each individual interface 151, 152, 153, and 154 that may communicatively connect to the mobile station 210 through several described mechanisms, examples of which are given above. Thus the interface 150 may include many conventional features of individual interfaces 151, 152, 153, and 154, including, for example, wireless transmitters and receivers, base stations, servers, switches, routers, and telephone lines. The interface 150 may thus send and receive data from the mobile station 210 directly or indirectly. The interface 150 may further include processors and/or other interface hardware capable of processing data received or sent to the mobile station 210. For example, the interface 150 may include processors and software capable of identify the data type received and formatting the data type in a way that a controller/processor 110 requests. Or, for example, the interface 150 may include hardware and software for receiving data from the content formatter and for properly transmitting the data through an appropriate individual interface 151, 152, 153, and/or 154.

As used above "data" may include any type of information conventionally transmitted throughout an IPTV network 100, including both control data and content data. Content data includes movies and television in digital format; internet content such as html, streaming content, or email messages; music; SMS messaging; voice mail; and/or any other type of viewable, executable, or perceivable content transmitted by an IPTV network 100. Control data may include all non-content data that directly or indirectly instructs IPTV network 100 behavior including, for example, http instructions for interacting with IP, internal instructions to the IPTV network controller/processor 110, scheduling information, and/or information not typically transmitted in conventional IPTV networks such as mobile station formatting information or instructions for interacting with the mobile station 210. This unique mobile station data may include, for example, data of a phone type or location of the mobile station 210 that may be communicated to/from the interface 150 and the IPTV network 100 for use in formatting content or output device.

The IPTV network 100 may include other conventional IPTV components including, for example, a central controller/processor 110 (also called IPTV middleware) that controls internal operations of the IPTV network 100 such as content selection and direction, task prioritization, and data processing. The IPTV network 100 may include stored user characteristics databases 170, IPTV content storage 180, and/or other IPTV network content and subscriber components. The IPTV network 100 may include a conventional IPTV interface 130 for connecting with and transmitting IPTV content to output devices 300. The IPTV network may be conventionally connected to content providers 400 that supply external content to the IPTV network.

The IPTV network may include a non-conventional content formatter 160 capable of formatting data, including content, sent by the IPTV network to be compatible with either mobile stations 210, wireless networks 200, and/or output devices 300. The content formatter 160 may receive data with both content and control data from the controller 110 and format the content data and control data based on a destination contained within the control data.

Further, the database 170 storing a plurality of user characteristics accessible by the IPTV network middleware 100 may include non-conventional user preferences, subscriptions, saved content, histories, and/or any other type of user characteristic. In conjunction with data sent and received by the IPTV network interface 150, the controller/processor 110 may transmit content data based on appropriately matched user characteristics and received data.

Figure 3:
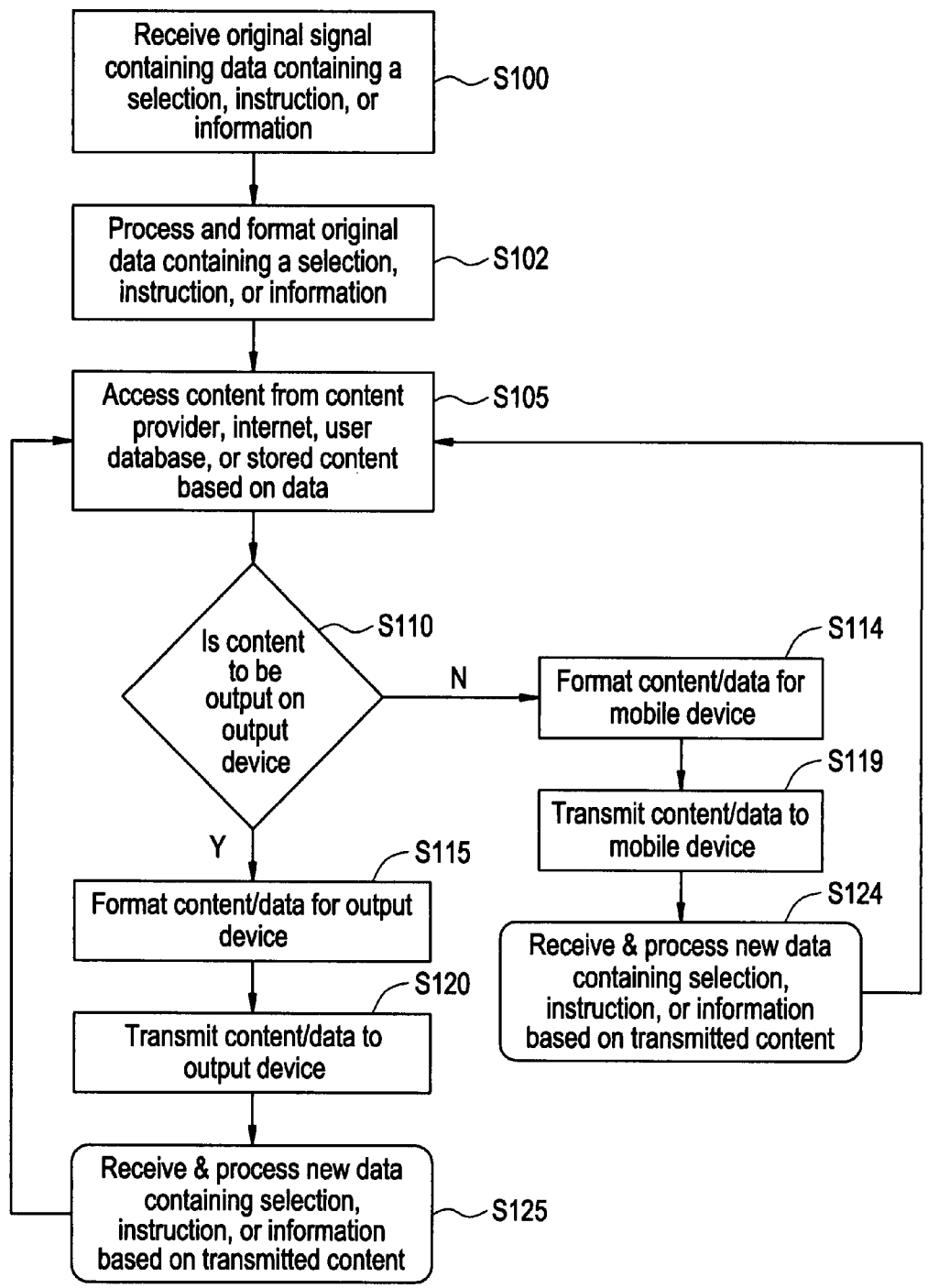
FIG. 3 illustrates an example method of operating an IPTV network

FIG. 3 is a flow chart of an example method of operating an IPTV network. As shown in FIG. 3, in step S100, an IPTV network, which may be capable of processing and transmitting IPTV content, receives data from a mobile station. Data may be both content and control data as defined above; for example, digital television programming, digital music, http instructions for interacting with an email server, internal instructions to the IPITV network, scheduling information, scheduling selections, content previews, and instructions for interacting with the mobile station 210. However, data received in step S100 may be primarily control data, and/or any content data transmitted to the IPTV network may be limited or compressed to preserve uplink bandwidth. For example, control data including a type of phone display and/or transmission protocol of the mobile station may be communicated to the IPTV network for use in formatting content, selecting output method, etc. Or, for example, content data including compressed voice data common to voice mail or a digital picture may be communicated to the IPTV network for use in formatting content, saving to a stored content or user characteristics database, or transmitting to another user through the IPTV network.

Data may be directly received from a mobile station or may be transmitted to a mobile network that, in turn, transmits the data, wirelessly or otherwise at this point, to the IPTV network. Wireless communication may be any conventional form or combination of conventional forms of wireless communication, for example, CDMA, WiFi, Bluetooth, GSM, infrared, and/or any suitable wireless communication protocol. Similarly, the mobile station may be a part of a conventional mobile network, for example, a cellular phone associated with a carrier network.

As shown in FIG. 3, an IPTV network processes the received data in step S102. Processing the data in step S102 and any communicative medium containing the data, whether it be a wireless signal, fiber optic packet, or the like, may be performed by an interface in the wireless network. The interface may identify incoming signals containing data to be received, determine the signal type, communications protocol, and other metadata of the transmitted data and properly receive and extract the received data from its communicative medium.

Once the data from the mobile station is processed in Step S102, the IPTV network may interact with the data in a manner similar to how the IPTV network would interact with data from a conventional co-located receiver. For example, as shown in Step S105, the IPTV processor/controller (again, this may also be called IPTV middleware) accesses an appropriate component based on the received data. For example, the data may indicate a selection of an internet site, and the middleware may access the site via internet protocol. Or, for example, the data may contain control data with an instruction to display certain stored content, and the middleware may access a database with the stored content. Thus, the IPTV network accesses, stores, or otherwise interacts with content and/or control data based on the data sent from the mobile station.

As shown in Step S110, the IPTV network then determines where the content is to be displayed, stored, or sent based on the received data. For example, the data may indicate that content is to be output to a specific television identified in the data or a specific computer with an associated IP address included in the data. Or, for example, the received control data could indicate that content data is to be displayed on the mobile phone that sent the wireless signal containing the data. Or, the received control data may request content data that may be output only to a particular type of device, in which case the IPTV network internally determines where the content data may be successfully output and formats and transmits the content data to that output device.

As a further example method, the data received in Step S100 may include control data regarding the location of the data origin. This location may be determined using any conventional process of locating mobile devices connected to wireless networks. The IPTV network may provide IPTV content based on this location and determine the output device in Step S110 based on this location, including providing content to a specific output device closest to the mobile station's location and providing content that is time-shifted to be appropriately displayed in the time zone of the mobile station location. For example, if a mobile station is in a location of an identified house, then the content may be put on a TV in that house.

If the IPTV network in Step S110 determines the content is to be displayed on an output device, the content is then formatted for the output device, such as a television or monitor, in Step S115.

As shown in Step S120, the formatted content is then transmitted to the output device, typically over internet protocol and/or any other conventional transmission means, where it may be displayed, executed, or otherwise performed on conventional output devices.

Alternately, the determination of Step S110 may indicate that content data is to be displayed on the mobile station. For example, the received control data may request a schedule of programs or a preview of a program to be shown on the mobile station. In this case, the content data is formatted for the proper mobile station in Step S114. The content selected for a mobile station in step S110 may require different formatting than that provided to a different output device in step S120. For instance, only a screenshot or textual synopsis of a television program may be provided to a text-only personal data assistant, while the live-action program may be provided to an output device such as a television. This formatting may be dependent upon mobile station features and available wireless bandwidth. In some cases it may be possible to transmit the same content data with the same formatting to either a mobile device or output device. For example, a mobile station such as a computer or mobile phone with a screen may be able to receive, display, execute, and otherwise perform live-action programs.

As shown in Step S119, the content data formatted for the mobile station is then transmitted to the mobile device. The formatting may be achieved by a specific formatter within the IPTV network or the interface may format the content into data and transmit that data using an appropriate transmission method. The transmitting may be, for example, by any method detailed in the receiving step S100. For example, the IPTV network may provide the data wirelessly from its interface to a mobile network using CDMA, and the mobile network may then transmit the formatted content wirelessly to the mobile station. Or, for example, the IPTV network may directly wirelessly transmit the formatted data to the mobile station from the interface. Or, for example, the IPTV interface may transmit the data over a phone line and PTSN to the wireless network, which then transmits the data to the mobile station.

The mobile device may then display, execute, or otherwise perform the received data and content therein. For example, the content may be a listing of emails retrieved from an email server, which is then transmitted to the mobile device to display, delete, and/or reply to the emails in the listing.

Data and IPTV content provided to one device in Step S120, such as to a television, may be different than data and IPTV content provided to a second device in Step S119, such as a mobile phone. In this way, a single user may watch IPTV content on one device and preview different IPTV content on a second device simultaneously provided by the same IPTV network. Similarly, a user may interact with one type of IPTV content, for example, internet browsing, on one device and interact with a different type of IPTV content, for example, digital music streaming, on a second device, both IPTV contents being provided by the same IPTV network.

Optionally, as shown in Steps S125 and S124, the IPTV network may receive further data from a mobile station in response to the content or control data provided to the output device or mobile station in Steps S120 or S119 respectively. Based on this further data, the IPTV network may access new content and repeat Steps 105-120 based on the further data. For example, an IPTV network may further receive a signal from a mobile device to delete an email from an email server after transmitting content including that email to a mobile device. The IPTV network may then delete the email indicated by the signal by accessing the internet in Step S105. In this way users may interact with various types of IPTV content continuously through a mobile station.

As shown in FIG. 4, another example embodiment of the present invention may include many of the same steps as those discussed in FIG. 3. Example methods of operating an IPTV network in FIG. 4 may include further steps S160, S165, and S170. In Step S160 whether processed control data received from a mobile station contains a unique user ID is determined. If the data does not, content may be accessed in Step S105 in accordance with the example method illustrated in FIG. 3.

If the received control data does include a user ID, in Step S165, the IV middleware accesses a database storing a plurality of user characteristics associated with the user ID. The database may contain several pieces of information regarding individual users, including subscriptions, included IPTV services, favorites, schedules, preferences, and any other individual user information. This information is associated with a particular user and accessed when a signal containing the user ID is received.

Once the database is accessed based on the data's user ID, IPTV content provided in Step S170 is based on both user information in the database and the contents of the received control data. For example, the database may include a list of services available to individual users. When control data is received with a particular user ID, the IPTV network may provide only the listed services in the associated database entry as content data to the mobile station or output device. As a further example, the database may include control data about a user's mobile device. When a signal is received with a particular user ID, the IPTV middleware may transmit content data containing IPTV content to the mobile phone in a format required by the mobile phone device. For example, a user's mobile phone may support only textual IPTV content, and the IP-IV middleware may transmit only textual content or synopsis of IP-IV content.

In accordance with example embodiment methods of operating an IPTV network, IP-IV content may be provided to several different output devices and mobile stations. An intermediate receiver co-located with an output device is not required, and a user may access the IPTV network from anywhere that the mobile station is able to send and receive wireless signals to the IPTV network.

A further example method may include operating an IPTV network with a mobile device that is compatible with previously described example methods of operating an IPTV network.

As shown in FIG. 5, a mobile device may be used to transmit data wirelessly and remotely to a wireless network and/or IPTV network. As shown in Step S300, the data may contain a selection, instruction, or information regarding an IPTV network. The data may be transmitted in accordance with transmissions described in other example embodiments.

As shown in Step S310, the data indicates where IPTV content is to be transmitted. If the data indicates that content is to be displayed on a non-mobile output device, for example, a television or monitor, then IPTV content is transmitted to the output device by the IPTV network is Step S315.

If the data indicates that content is to be displayed on the mobile device, then IPTV content is formatted for and transmitted to the mobile device in Step S320, where the mobile device receives the content from the IPTV network. The content may be received to the phone using any method of transmission described above in example embodiments.

Optionally, as indicated in Step S330, a selection from the transmitted content may be made and transmitted back to the IPTV network. The mobile device may then receive a second IPTV content in Step S340 based on that selection in Step S330.

The transmission and reception of IPTV content described in the example method illustrated in FIG. 5 may be enabled by, for example, example methods of operating IPTV networks described above. That is, the same signals and data transmitted in Step S300 may be the signals and data received in Step S100 of FIGS. 3 and 4.

Example embodiments of the present invention being thus described, it will be obvious that the same may be varied in many ways. For example, it is understood that the above-described IPTV content may include any range of services and content available to IPTV networks that may be modified to be displayed, executed, or otherwise performed on mobile stations.

Such variations are not to be regarded as a departure from the spirit and scope of the exemplary embodiments of the invention, and all such modifications as would be obvious to one skilled in the art are intended to be included within the scope of the invention.

What is claimed:

1. A method of operating an Internet Protocol Television (IPTV) network comprising:
    receiving at an IPTV network, data from a mobile station;
    determining whether to transmit IPTV content to a multimedia output device separate from the mobile station or to the mobile station, the determining based on whether the data from the mobile station identifies the multimedia output device; and
    transmitting from the IPTV network an IPTV content based on the data from the mobile station to the determined multimedia output device or the mobile station.

2. The method of claim 1, wherein transmitting the IPTV content includes transmitting the IPTV content to the mobile station.

3. The method of claim 2, wherein the IPTV content is formatted to be displayed, executed, or played on the mobile station.

4. The method of claim 1, wherein the IPTV content includes at least one of a television program, film, internet access and browsing application, telephone, voice-over-internet-protocol communication, video communication, email, voicemail, music, digital file transfer, and scheduling information.

5. The method of claim 1, wherein the data includes a user ID, and wherein the IPTV network includes a database storing a plurality of user characteristics.

6. The method of claim 5, wherein the user ID is associated with at least one user characteristic in the plurality of user characteristics, and wherein the IPTV content is based on the associated at least one user characteristic.

7. The method of claim 5, wherein the plurality of user characteristics include at least one of a user preference, user schedule, user subscription, and user history.

8. The method of claim 1, further comprising:
    receiving at the IPTV network, a selection within the transmitted IPTV content; and
    transmitting from the IPTV network an IPTV content based on the selection.

9. The method of claim 1, wherein the data is received directly at the IPTV network from the mobile station using one of code division multiple access, global system for mobile communication, WiFi, Bluetooth, 802.11, and infrared wireless communications.

10. The method of claim 1, wherein the data is received indirectly from the mobile station through at least one of a wireless network, the internet, and a public telephone switching network.

11. The method of claim 1, wherein the data includes a user location, and wherein the IPTV content is transmitted to the location.

* * * * *